United States Patent Office 2,899,231
Patented Aug. 11, 1959

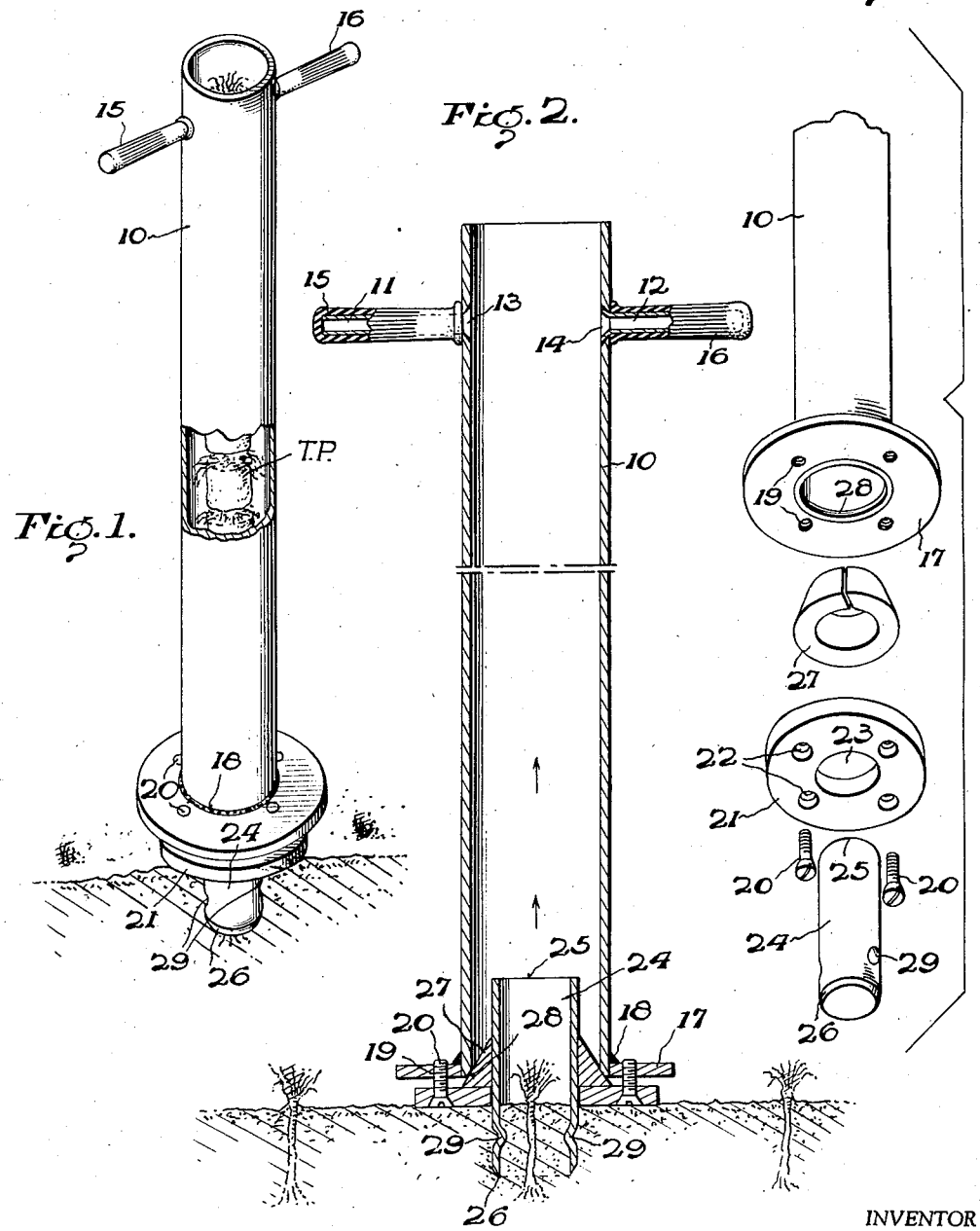

2,899,231

TURF PLUG CUTTER

Robert F. Steiner, Bethesda, Md.

Application April 20, 1955, Serial No. 502,622

1 Claim. (Cl. 294—50.7)

The present invention relates to a turf cutting tool.

Heretofore, there have been many forms of tools used for plugging portions of turf so as to form holes for the purpose of planting and transplanting various types of grasses, plants, tulip bulbs and the like. These prior tools have all been of one size and for one specific use, that is, either for planting bunch grass or for a more specific purpose such as for planting bulbs of various sizes. For example, in order to plant the various grasses or bulbs it was necessary to have a separate tool for each operation. Accordingly, it is an object of this invention to provide interchangeable plugging devices for a tool of this kind so that only one complete tool is needed.

Another object of the invention is to provide a detachable cutting tool for a turf plugger which is adjustable vertically for depth.

Another object is to provide in combination with a vertically adjustable cutter a ground engaging gauge plate.

A further object is to porvide a detachable cutter for turf plugging tools and the like which may be readily removed for sharpening.

Still a further object is to provide a novel weeding tool.

With the above and other objects in view the device is best understood by reference to the following drawings wherein one embodiment of the invention is illustrated.

In the figures:

Figure 1 represents a perspective view of the device cutting away a section in the center of the same to illustrate how the cut and removed turf plugs are picked and fed up through the bore of the tool for subsequent discharge.

Figure 2 is an elongated cross sectional view of the cutter tool, its detachable connection, the plug collecting and discharge cylinder and its operating handle.

Figure 3 is an exploded view showing the individual parts in perspective.

Referring in detail to the drawing and first with particular reference to Figure 2.

The device comprises a cylinder 10 formed with handle means adjacent one end thereof. The handle means comprise tubular sections 11 and 12 secured in diametrically opposite openings 13 and 14 formed in the cylinder 10. The respective ends of each of the handle tubes 11 and 12 are turned over and soldered flush with the bore of the cylinder around the walls of these openings. Preferably each handle tube 11 and 12 is covered with a rubber hand grip 15 and 16, respectively. The opposite end of the cylinder 10 is formed with a flange 17, which may be integral with the remainder of the cylinder or soldered thereto as indicated at 18. This flange 17 is formed with threaded openings 19 for receiving threaded fastener elements 20, see Figure 3. These fastener elements or screws 20 are carried by a gauge disc 21, which is formed with fastener openings 22 which are alignable with the fastener openings 19 of the flange 17 and a central tool receiving opening 23. Preferably the openings 22 are countersunk so the heads of the fasteners 20 will be flush with the exterior ground engaging surface of the gauge disc 21.

The cylindrical plugging cutter 24 is adapted to be guided and adjustably extended or retracted with respect to the gauge disc 21 when it is inserted within the opening 23. This cylindrical cutter tool extends upwardly into the cylinder 10 at its non-cutting end 25 and projects downwardly below the gauge disc 21 at its cutting end 26. To secure the cutter in fixed position with respect to the cylinder 10 and the gauge disc 21 there is provided a split collar 27 formed of plastic, copper or other material, which embraces the intermediate outer circumference of the cutter and is tapered toward the bore of the cylinder 10, which cylinder is formed with an annular chamfered seat surface 28. This seat surface engages the tapered exterior surface of the split collar 27 as it is forced into the bore by the inner surface of the gauge disc 21, when the fastener screws 20 are threaded in the respectively aligned openings 19 and 22 of the flange 17 and the gauge plate 21, respectively. As the fasteners 20 are tightened by means of a screw driver or the like the collar 27 is compressed tightly around the exterior wall of the cylinder cutter, to thereby hold the same fixed. The tool is then ready for use as indicated in Figures 1 and 2 by grasping the handles 15 and 16 and pushing downwardly thereon and causing the tool cutting edge to cut through the turf. Positioned upwardly from the cutting edge 26 of the cutter 24 are inwardly extended projections 29. These projections may be diametrically arranged opposite each other or alternately staggered, as desired. The projections bite into the material of the picked up plug, which has been cut from the turf and prevent the plug from being pulled out of the bore of the cutter when the tool is raised and moved to another position for the next plugging operation. Thus, depending upon the size of the cylinder 10 the tool may be used continuously without becoming clogged up as each successive plug pushes the next adjacent uppermost one upwardly and eventually out from the top of the cylinder 10.

If the tool is not biting deep enough into the turf it is a very simple matter to adjust the depth of the cutter 26 by loosening the fasteners 20 and relieving the grip action of the collar 27, whereby the tool 24 may be pulled outward with respect to the gauge disc 21 for a deeper cut. Also to facilitate precision depth the exterior wall of the cutter may be formed with gauge lines, if desired, alignable with the ground face of the gauge disc 21.

To use the tool it is positioned vertically from the ground level, the handles are grasped with both hands and the user's feet are placed on either side of the barrel or flange 17. The cutter by the weight of the user is forced into the ground to the gauge disc. Then the feet are removed from the flange and a slight turn is given to the tool and it is lifted out of the ground with a plug of soil or grass therein.

Thus there is provided a novel turf plugging tool or the like with adjustable and interchangeable cutter members, whereby various sizes of openings may be formed in the turf for the purpose of planting various formations of grasses, plants, bulbs and the like.

Without further description it is believed that my present invention and its many advantages are clear and understandable to others in this art, and while only one physical embodiment of the cutting tool is disclosed, it is to be expressly understood the invention is not limited thereto, as various changes may be made in the construction, combination and arrangement of the parts as may now appear to those skilled in the art.

For a definition of the scope of the invention, reference should be had to the appended claim.

What is claimed is:

A turf plugging tool comprising an open ended turf plug receiving and discharging cylinder having a smooth cylindrical bore from one end thereof to the other, one end being a turf plug receiving end and the other a turf plug discharge end, a pair of handles projecting diametrically from the outer wall of said cylinder adjacent discharge end thereof, the plug receiving end of said cylinder having an annular inner chamfered seat formed around the inner rim of the cylinder bore at the turf plug receiving end, a flange rigid with said cylinder and projecting radially outwardly thereof adjacent the receiving end thereof, said flange being provided with a plurality of circumferentially spaced threaded openings having their respective axes extending substantially parallel to the longitudinal axis of said cylinder, a turf engageable gauge plate disposed adjacent the receiving end and below said flange in parallel relation therewith and in spaced relation to said plug receiving end of said cylinder, said gauge plate being provided with circumferentially spaced openings having their respective axes substantially parallel to the longitudinal axis of said cylinder and in alignment with said spaced threaded flange openings, threaded fastener elements extended through said gauge plate openings and threaded into said first openings aligned therewith for effecting adjustment of said gauge plate relatively to said flange, said gauge plate being provided with a circular opening co-axial with said cylinder and whose diameter is less than that of the bore in said cylinder, a cylindrical cutter axially aligned with the said cylinder projecting through said last opening and having cutting and non-cutting ends with the latter projecting into said receiving end of the cylinder, and an axially split collar having a bore freely receiving said cutter, a base normal to the axis of said bore seating on said gauge plate and an outer frusto-conical wall concentrically projecting into the plug receiving end of the cylinder engaged with said chamfered seat around the inner rim of the cylinder bore, whereby upon adjustment of said gauge plate toward said flange by said threaded fastener elements the wall of said bore in said collar frictionally grips the outer wall of said cutter for retaining same in any axially adjusted position therein.

References Cited in the file of this patent
UNITED STATES PATENTS

| | | |
|---|---|---|
| 313,476 | Cummings | Mar. 10, 1885 |
| 657,712 | Thomas | Sept. 11, 1900 |
| 1,044,109 | Weaver | Nov. 12, 1912 |
| 1,548,865 | Bull | Aug. 11, 1925 |
| 1,653,994 | Emmet | Dec. 27, 1927 |
| 1,783,026 | Ober | Nov. 25, 1930 |
| 1,873,620 | Moore | Aug. 23, 1932 |
| 1,970,624 | Recker | Aug. 21, 1934 |
| 2,203,170 | MacDonald | June 4, 1940 |
| 2,583,577 | Kingsbury | Jan. 29, 1952 |
| 2,686,690 | Kushnir | Aug. 17, 1954 |